United States Patent
Ziegenhorn et al.

(10) Patent No.: US 6,922,033 B2
(45) Date of Patent: Jul. 26, 2005

(54) BARBEQUE COVER SUPPORT DEVICE

(76) Inventors: John T. Ziegenhorn, 1064 Christina Ct., Lake Elsinore, CA (US) 92530; Eric A. Anderson, 1065 Christina Ct., Lake Elsinore, CA (US) 92530

( * ) Notice: Subject to any disclaimer, the term of this patent is extended or adjusted under 35 U.S.C. 154(b) by 0 days.

(21) Appl. No.: 09/997,310

(22) Filed: Nov. 28, 2001

(65) Prior Publication Data

US 2002/0074961 A1 Jun. 20, 2002

Related U.S. Application Data

(60) Provisional application No. 60/216,304, filed on Nov. 28, 2000.

(51) Int. Cl.[7] .............................. H02P 1/00; H02P 3/00; H02P 7/00; H02H 7/08; G05B 5/00
(52) U.S. Cl. ..................... 318/445; 318/480; 126/36; 126/13; 126/144; 126/192; 126/25 R; 126/29; 126/39; 126/198; 126/193; 248/364
(58) Field of Search .................. 126/191–194, 126/286–287, 9, 13, 217, 79, 36, 37 B, 39 R, 41 R, 39 C, 39 E, 17, 18, 19 R, 144, 211, 214 R, 190, 198, 19.5, 500–506, 384.1, 1 R, 25 R, 3, 197, 538, 201, 29, 215, 503, 512; 248/364; 49/324, 13, 14; 219/620, 700; 99/324, 419, 341, 421 H, 339, 329 P, 443 C, 451, 467, 473, 646 R, 142, 335; 426/525; 220/592.01; 266/900; 318/445, 480

(56) References Cited

U.S. PATENT DOCUMENTS

| | | | | |
|---|---|---|---|---|
| 4,616,123 A | * | 10/1986 | Zagoroff | ..................... 219/388 |
| 4,759,338 A | | 7/1988 | Croft | |
| 4,837,414 A | * | 6/1989 | Edamula | ..................... 219/714 |
| 4,852,476 A | * | 8/1989 | Sanchez | ................... 99/443 R |
| 4,895,130 A | | 1/1990 | Staschke | |
| 4,962,750 A | * | 10/1990 | Bridgewater | ................. 126/503 |
| 5,058,493 A | * | 10/1991 | Basek et al. | .................. 99/339 |
| 5,185,172 A | * | 2/1993 | Barkhau et al. | ............ 426/523 |
| 5,341,727 A | * | 8/1994 | Dickson | ...................... 99/335 |
| 5,371,829 A | * | 12/1994 | Hoeberigs | .................... 392/416 |
| 5,410,950 A | * | 5/1995 | Rone | ..................... 99/421 HV |
| 5,450,841 A | * | 9/1995 | Whitaker et al. | ........... 126/512 |
| 5,611,264 A | * | 3/1997 | Studer | .......................... 99/340 |
| 5,665,438 A | * | 9/1997 | Lee et al. | ...................... 428/31 |
| 5,779,032 A | * | 7/1998 | Iimura et al. | ................. 206/6.1 |
| 5,801,357 A | * | 9/1998 | Danen | ........................ 219/403 |
| 5,829,426 A | | 11/1998 | Cloutier | |
| 5,850,828 A | * | 12/1998 | Valentino | .................. 126/25 R |
| 5,934,182 A | * | 8/1999 | Harter et al. | .................. 99/349 |

(Continued)

FOREIGN PATENT DOCUMENTS

| | | | |
|---|---|---|---|
| DE | 19926762 A1 * 12/2000 | ............. F24C/7/08 |
| FR | 2614060 A1 * 10/1988 | ........... E05B/47/02 |
| JP | 361147023 A * 7/1986 | ............. F24C/1/00 |

*Primary Examiner*—David Martin
*Assistant Examiner*—Renata McCloud
(74) *Attorney, Agent, or Firm*—Knobbe, Martens, Olson & Bear LLP (57) ABSTRACT

A cooking apparatus for controlling the opening of a cover over a barbecue grill includes a motor for opening and closing the cover over the barbecue grill, with the motor connected to the cover by a coupling rod. The cooking apparatus includes, in one embodiment, a counterweight attached at the rear of the barbecue cover. The cooking apparatus also comes with a remote control for transmitting control signals to the motor. The remote control transmits start and stop signals to the motor, or alternatively, the motor operates only during the transmission of control signals to the motor. The remote control may also transmit signals to control flow of a combustible gas. The barbecue cover opener is removable from the barbecue grill. Control of the motor allows movement of the cover to stop at any point within the full range of the cover being opened or closed.

29 Claims, 10 Drawing Sheets

U.S. PATENT DOCUMENTS

| | | | | |
|---|---|---|---|---|
| 5,968,574 A | * | 10/1999 | Sann | 426/510 |
| 5,970,209 A | * | 10/1999 | Toyokura | 392/307 |
| 5,996,572 A | * | 12/1999 | Ilagan | 126/25 AA |
| 6,076,451 A | * | 6/2000 | Studer | 99/340 |
| 6,326,754 B1 | * | 12/2001 | Mullet et al. | 318/480 |
| 6,400,112 B1 | * | 6/2002 | Fitzgibbon et al. | 318/445 |
| 6,437,291 B1 | * | 8/2002 | Hopponen | 219/395 |
| 6,713,741 B2 | * | 3/2004 | Miller | 219/700 |

* cited by examiner

BARBEQUE COVER SUPPORT DEVICE

REFERENCE TO RELATED APPLICATION

The present patent application claims priority to U.S. Provisional Application No. 60/216,304, filed Nov. 28, 2000, titled "REMOTE-CONTROL (OPEN & CLOSE) BAR-B-QUE LID BY MECHANICAL COUPLING," the content of which is hereby incorporated by reference in its entirety.

FIELD OF THE INVENTION

The present invention relates generally to barbecue grills.

BACKGROUND

Generally, barbecue grills include an oven-like housing for cooking food on a grilling surface. A heat source, such as burning charcoal or a gas flame radiates heat from beneath the grilling surface directly to the food lying on the grilling surface. A cover over the grilling surface retains heat produced by the heat source. The cover also traps smoke and steam that enhance the flavor of the food being cooked.

Some covers include a window that allows the cook to monitor the cooking of the food. However, smoke often clouds the window and prevents the cook from visually inspecting the food. Thus, even with the window the cook may sometimes need to open the cover just to check the cooking process.

The cover provides convenient access to the cooking food, but fully opening the cover allows heat and smoke to escape from the grill. Opening and closing the cover also affects the flow of oxygen within the grill. The rate of combustion for a fuel source depends in part on the amount of oxygen available. The combustion rate in turn affects the grill temperature. A low oxygen level within the grill may also reduce or eliminate fat-fueled fires. The cover is therefore a useful component of a barbecue grill.

Some barbecue grills do not have a cover, and others provide a cover that is removable. However, there is a need for a barbecue grill that allows a cook to control the size of the opening between the grill and the cover. It is therefore desirable to provide a grill having a cover with an adjustable opening to control oxygen circulation and retain heat and smoke.

Barbecue grills that use a combustible fuel source such as charcoal briquettes do not always provide a constant source of heat. When the briquettes are first ignited, very little heat is produced. After the briquettes become fully ignited, a peak temperature is reached. The temperature then gradually declines as the fuel is consumed. The size of the opening between the cover and the grilling surface affects the temperature on the grill, and it is therefore desirable to adjust the cover opening throughout the cooking process.

SUMMARY OF THE INVENTION

The preferred embodiments described below solve these and other problems by providing, in certain preferred embodiments, a control mechanism for adjusting the opening between a cover and the barbecue grilling surface. One of ordinary skill will recognize that the control mechanism may be designed in a variety of ways in addition to the exemplary embodiments provided herein.

In one embodiment, a barbecue grill comprises a grilling surface, a cover for providing an adjustable opening over the grilling surface, and a motor for opening and closing the cover. The motor is coupled to the cover. The grill may additionally comprise a counterweight attached at the rear of the cover. The motor is removable from the grill. The electric motor may be powered through an AC outlet, or alternatively by battery or solar power.

A remote control is used to transmit control signals to the motor. In one example, the remote control transmits start and stop signals. In another example, the motor operates while a button on the remote control is pressed and the remote control is transmitting signals. Alternatively the remote transmits open or close control signals. The motor may position the cover at any point within the full range of movement. In yet another example the remote control additionally transmits control signals to control the flow of a combustible fuel.

A method for controlling the opening of a cover over a grilling surface causes a motor to operate upon receiving a first signal, where the motor is coupled to the cover such that operation of the motor causes an adjustment in the placement of the cover over the grilling surface. The method causes the motor to stop operating upon receiving a second signal. Activating a first control generates a first signal. Releasing the first control generates a second signal. Alternatively, activating a second control generates a second signal.

An apparatus for attaching a motor to a cover of a grilling surface includes a motor support beam having an adjustable length. The motor support beam includes a motor attachment surface for attachment to the motor and at least one base attachment surface for attachment to a support base of the grilling surface. A counterweight having a cover attachment surface is attached to the cover of the grilling surface. A coupling rod attaches the motor to the counterweight. Alternatively, a coupling rod couples the motor to the cover of the grilling surface. The motor support beam comprises a first portion insertable into a second portion. The first portion has a threaded exterior portion, and said second portion has a threaded interior portion, so that the length of said motor beam is determined by turning the first portion with respect to the second position. Alternatively, the motor support beam comprises a spring member that presses the first portion away from the second portion. In yet another embodiment, at least one of the first portion and the second portion has a plurality of holes, the length of said motor beam being determined by inserting a pin through one of the holes. The motor may rest on the motor support beam or suspend from the motor support beam.

DETAILED DESCRIPTION OF THE PREFERRED EMBODIMENTS

Partially opening the cover of a barbecue grill allows a chef to monitor the cooking process. Even raising the cover as little as an inch or two allows the chef to watch for grease fueled fires and monitor the cooking food. Where the cover is held partially open, the chef can attend to other tasks while still visually monitoring the cooking of the food on the grill.

Additionally, many grills use wood or wood chips to generate smoke and flavor the food. If the cover is kept closed, there is insufficient oxygen to allow combustion of the wood, and this results in a reduction of smoke for flavoring the food. However, opening the cover allows the wood or wood chips to continue smoldering, and the food receives the desired smoke flavor.

Figure 1:
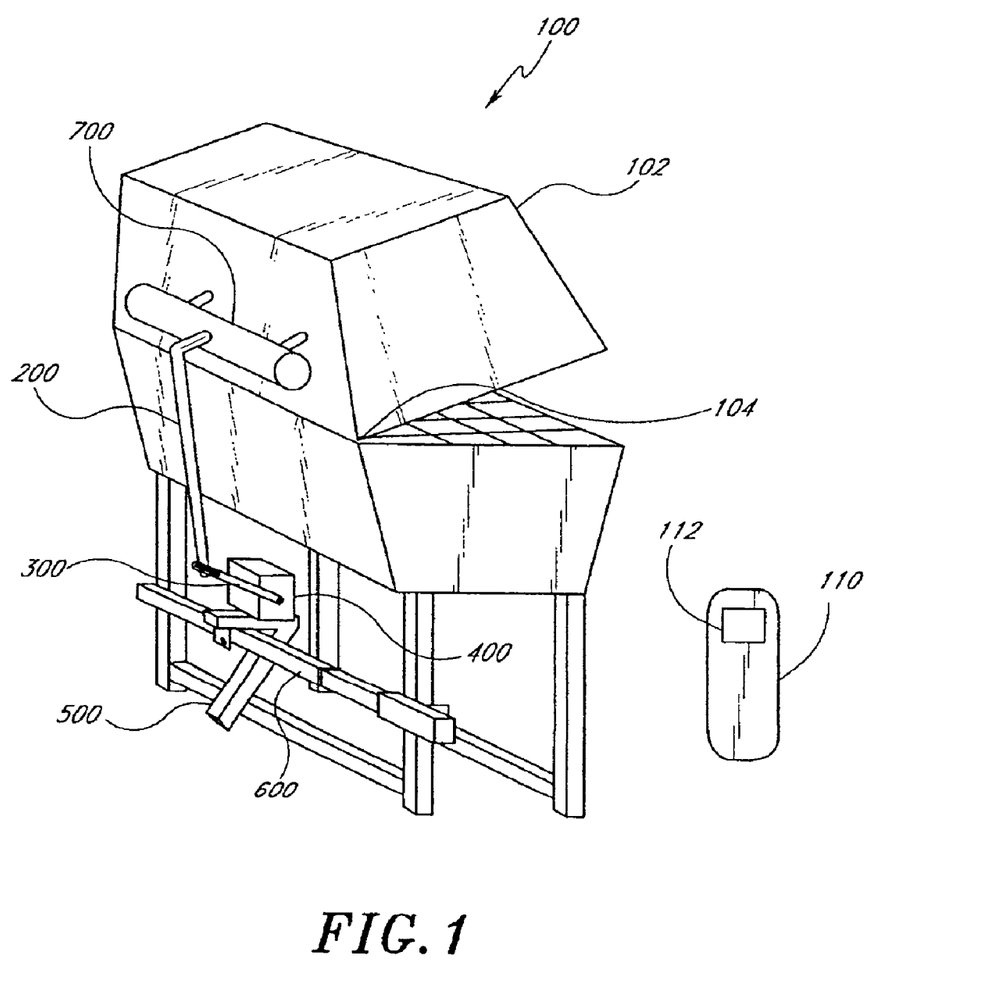
FIG. 1 is a side elevational view illustrating a cooking apparatus incorporating the control mechanism for adjusting the opening of a cover over a barbecue grill.

FIG. 1 shows a cooking apparatus 100 having an adjustable cover 102. The cover 102 is opened and closed by a motor and receiver assembly 400. In the illustrated example, an electric motor drives a slotted motor attachment arm 300 in a clockwise direction. The attachment arm is connected to a coupling rod 200 with swivel connectors. As shown in the exemplary illustration, the coupling rod is connected to a counterweight 700. The counterweight 700 is attached to a rear portion of the cover 102 such that the counterweight 700 extends beyond a pivot point 104. The counterweight 700 offsets the weight of the cover 102 so that the load on the electric motor is reduced.

FIG. 1 shows the cover 102 in a partially open position. As the motor drives the attachment arm 300 clockwise, the coupling rod 200 rises. This in turn causes the cover 102 to close about the pivot point 104. When the attachment arm 300 runs parallel to the coupling rod 200, the cover 102 is in the closed position. As the motor continues to operate, the attachment arm 300 continues to rotate. This causes the coupling rod 200 to move downward. The downward movement of the coupling rod 200 acts on the counterweight 700 and forces the cover 102 to open about the pivot point 104. The attachment arm eventually reaches a downward position and is once again positioned parallel to the coupling rod 200. At this point, the cover 102 is in the open position. Continued operation of the motor causes the attachment arm 300 to complete the rotation and the cycle is then started over again. In one embodiment, the motor operates at approximately three revolutions per minute (3 rpm).

Alternatively, the motor turns clockwise to lower the cover 102 and counter-clockwise to raise the cover 102. Although still feasible, the attachment arm does not need 360° of movement to open and close the cover 102 with this configuration. For example, the grill could be configured to be fully closed when the attachment arm 300 is 45° above level, and fully open when the attachment arm 300 is 45° below level.

One of ordinary skill will understand that there are various ways of raising and lowering the cover 102. In one alternative, the motor slides a rod up and down to lower and raise the lid. In another example, the attachment arm is connected to a front portion of the cover.

As shown in the exemplary illustration of FIG. 1, the motor rests on a motor mount stabilizer bar 500. The motor mount stabilizer bar 500 is connected to the cooking apparatus 100 with an adjustable crossbar support beam 600. Alternatively, the motor is mounted in other locations such as directly to a crossbar or suspended beneath the cooking apparatus 100.

Figure 2:
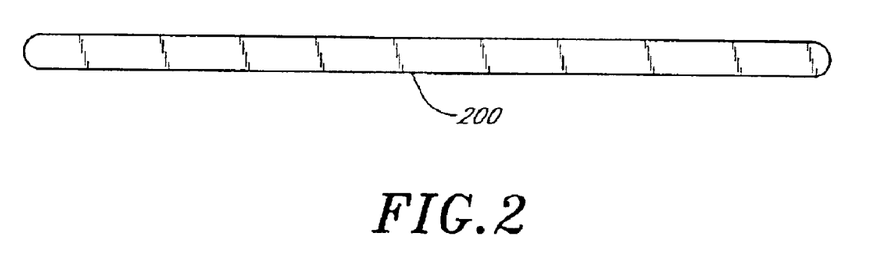
FIG. 2 shows a coupling rod for connecting a motor to an adjustable cover.

The counterweight 700 is connected using a coupling rod 200 with swivel fasteners that are attached to a slotted motor attachment arm 300. FIG. 2 shows one embodiment of a cylindrical coupling rod 200. One of ordinary skill will understood that the coupling rod 200 may have various shapes.

Figure 3:
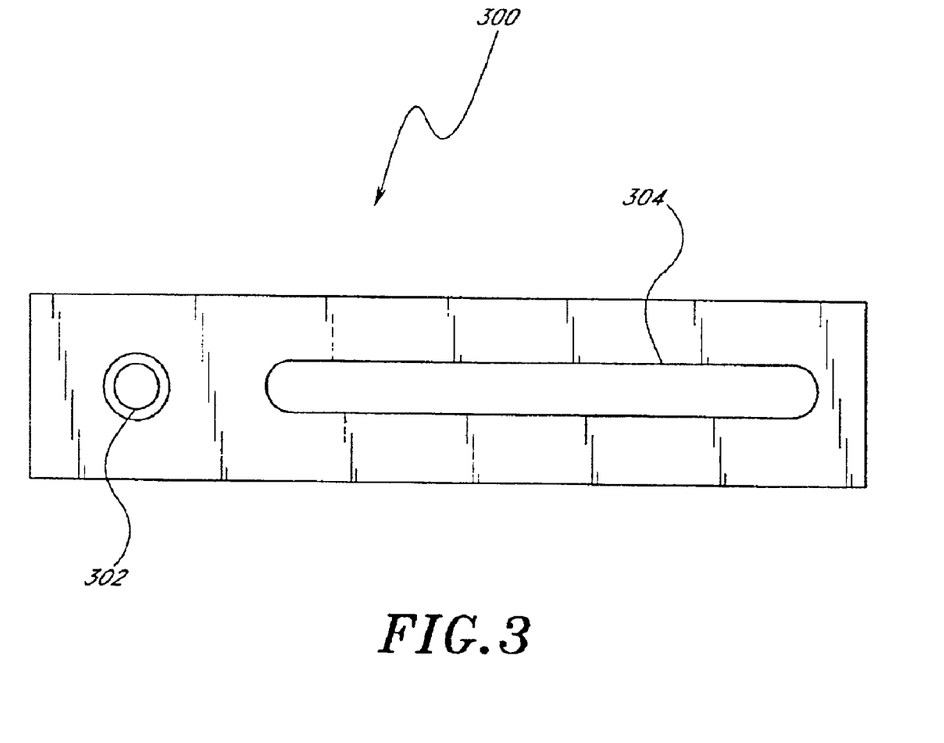
FIG. 3 shows a slotted motor attachment arm.

FIG. 3 illustrates an example of a slotted motor attachment arm 300. As shown in this example, the motor attachment arm 300 is connected to the armature of an electric motor. As the electric motor operates, the motor attachment arm 300 rotates about the pivot point 302. The motor attachment arm 300 is connected by placing swivel connectors within the slot 304. The swivel connectors join the motor attachment arm 300 to the coupling rod 200. Placing the motor attachment arm 300 in the down position forces the coupling rod 200 down, which in turn causes the counterweight 700 to move downward. This downward movement of the counterweight 700 at the rear of the cover 102 causes the cover 102 to rotate open about the cover pivot point 104. Similarly, when the motor attachment arm 300 is in the up position the coupling rod 200 does not act on the counterweight 700 and the cover will be in the closed position. Each full revolution of the motor attachment causes the cover 102 to open and close. In one embodiment, the coupling rod 200 is removable from the cover 102 or the motor attachment arm 300 to allow manual opening of the cover.

Figure 4:
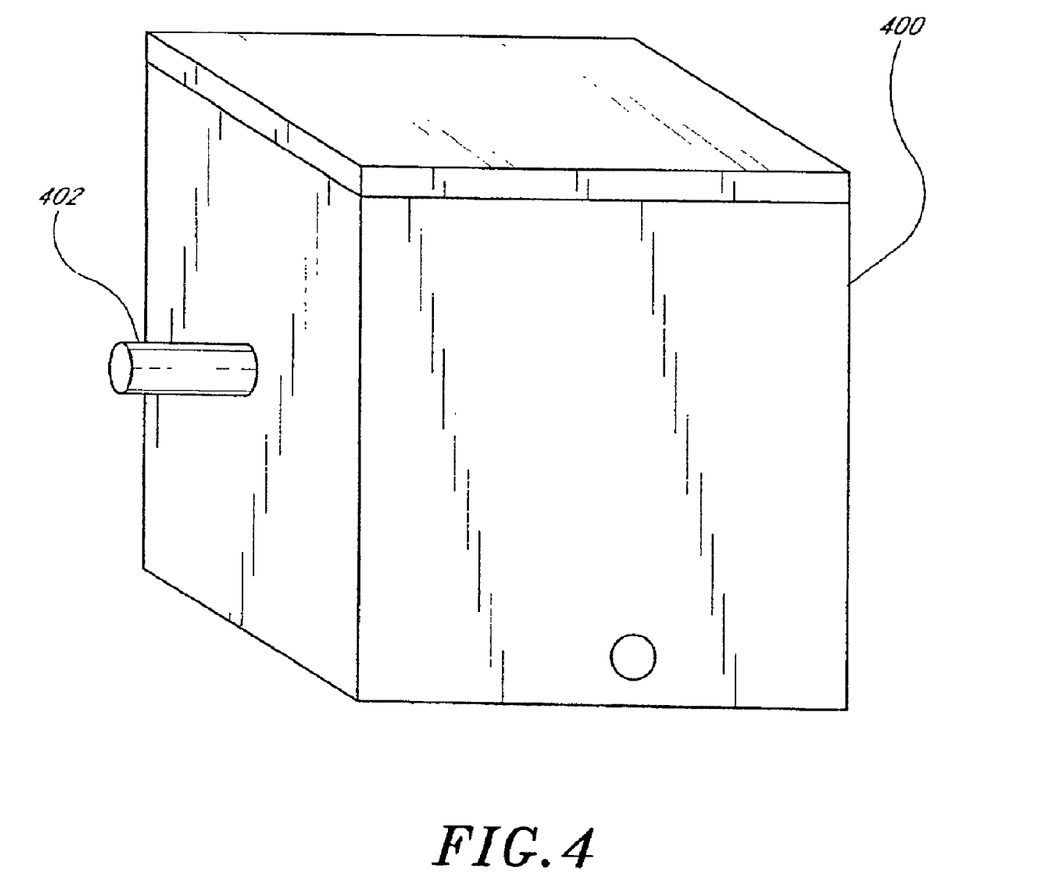
FIG. 4 shows a motor and receiver assembly.

FIG. 4 illustrates a motor and receiver assembly 400. As shown in this example, the motor and receiver assembly 400 is constructed so that the motor and electronic components are housed within a weather-resistant enclosure. The electric motor is plugged into an electrical outlet. As an example, an A.C. gearmotor having an output speed of 3 R.P.M. is used. The motor operates from a 120 V/60 Hz power supply. Alternatively, the electric motor receives power from sources such as battery cells, solar cells, or a generator.

In one embodiment, the motor and receiver assembly 400 includes a control attached to the grill 100. Alternatively or additionally, the motor and receiver assembly 400 receives signals from a remote control. For example, a hand-held, battery-powered transmitter sends signals to a receiver instructing the motor to raise or lower the cover 102. In one embodiment, the transmitter sends a start signal to start the motor and a stop signal to stop the motor. Alternatively, the transmitter sends a single signal to toggle the motor on and off. In one example, both the start signal and the stop signal are initiated by pressing the same button. In another example, the transmitter includes buttons for sending a start signal and a stop signal.

Alternatively, the transmitter sends a signal when a user activates a control, and continues transmitting the signal until the user releases the control. Thus, the motor continues to operate while it receives a signal from the transmitter.

The motor rotates the coupling arm 300 clockwise or counter-clockwise. In another embodiment, the motor rotates the coupling arm 300 in a single direction.

The remote control may also include buttons for controlling the flow of propane in a gas grill.

One example of a remote control suitable for controlling the cover is a wireless RF remote-control having an on/off switch. The remote uses a 12 volt battery and operates at 312 MHz. The remote is capable of transmitting over 50 feet to a receiver attached to the grill 100. The receiver uses a 120 V power supply and also operates at 312 MHz. The receiver has an output of 120 V AC, and can handle a motor load of ⅓ HP.

Figure 5:
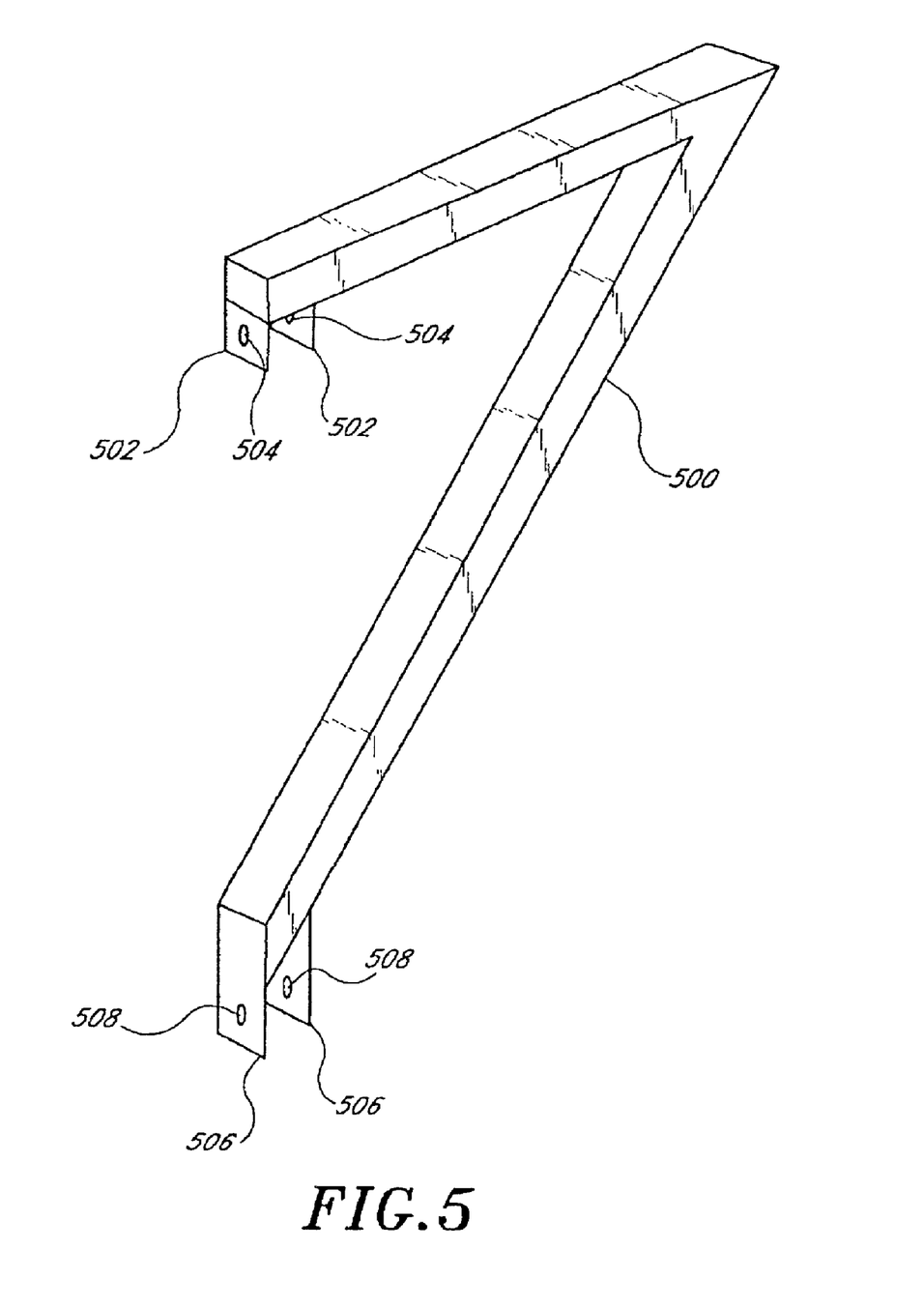
FIG. 5 shows a motor mount stabilizer bar.

FIG. 5 illustrates a motor mount stabilizer 500 for supporting the motor and receiver assembly 400. The motor mount stabilizer is designed for attachment to a large number of commercially available barbecue grills. As an example, the stabilizer 500 is attached to an existing barbecue cart frame using an adjustable crossbar support beam 600. While not required, the mass of the motor may be balanced over the adjustable crossbar support beam 600. As shown, the exemplary stabilizer illustration includes crossbar attachment plates 502 for attachment to the adjustable crossbar support beam 600. The crossbar attachment plates 502 may be located at the end of the upper portion of the motor mount stabilizer 500. Alternatively, the crossbar attachment plates 502 are located at the center of the upper portion of the motor mount stabilizer 500. In another example, the crossbar attachment plates 502 are located directly above frame attachment plates 506. In one embodiment, crossbar attachment plates 502 and frame attachment plates 506 include holes 504 and 506, respectively, for inserting a bolt or pin. Alternatively, the crossbar attachment plates 502 and frame attachment plates 506 include threaded openings for insertion of a thumbscrew. The thumbscrew may then be tightened for attachment of the motor mount stabilizer 500 to the cooking apparatus 100.

Figure 6:
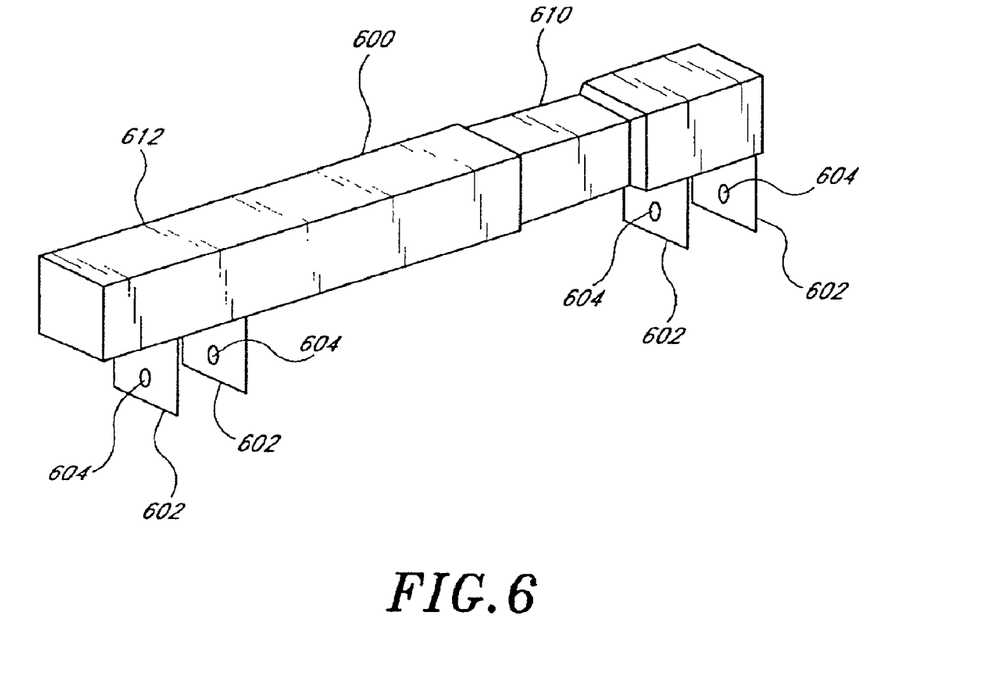
FIG. 6 shows an adjustable crossbar support beam.

FIG. 6 shows one embodiment of an adjustable crossbar support beam 600. The crossbar support beam 600 is designed to be attached to an existing barbecue without any modification to the barbecue frame or chassis. A retractable portion 610 allows the adjustable crossbar support beam 600 to fit a large number of preexisting barbecue units. The support beam 600 may be attached to the cooking apparatus 100 by bolting attachment plates 604 to the base or side supports of the cooking apparatus 100. Alternatively, the support beam 600 may be attached to the cooking apparatus 100 by tightening thumbscrews through attachment plates 604 to the base or side supports of the cooking apparatus 100.

Figure 6A:
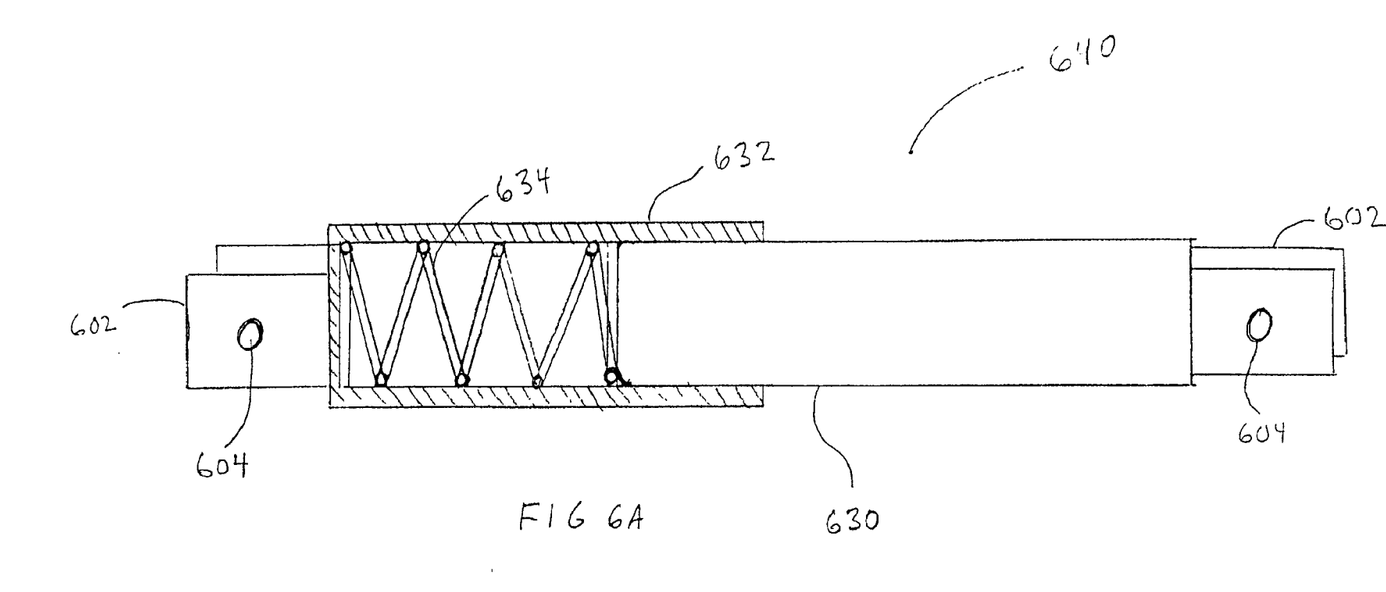
FIG. 6A shows an adjustable crossbar support beam having an internal spring.
Figure 6B:
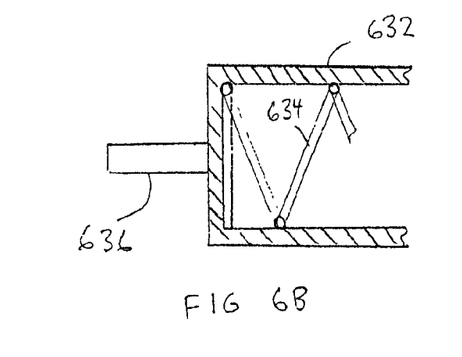
FIG. 6B shows an adjustable crossbar support beam with a pin at the end.

FIG. 6A shows another embodiment of an adjustable crossbar support beam 640. A spring member 634 places pressure on a retractable member 630 and a stationary member 632. In one embodiment the spring member 634 provides sufficient pressure to prevent the attachment plates from disengaging from the grill. In another embodiment, the support beam 630 is attached to the cooking apparatus 100 by bolting attachment plates 604 to the base or side supports of the cooking apparatus 100. Alternatively, the support beam 600 may be attached to the cooking apparatus 100 by tightening thumbscrews through attachment plates 604 to the base or side supports of the cooking apparatus 100. FIG. 6B shows a crossbar support beam 640 having a pin 636 at the end for inserting into a hole in the grill.

Figure 6C:
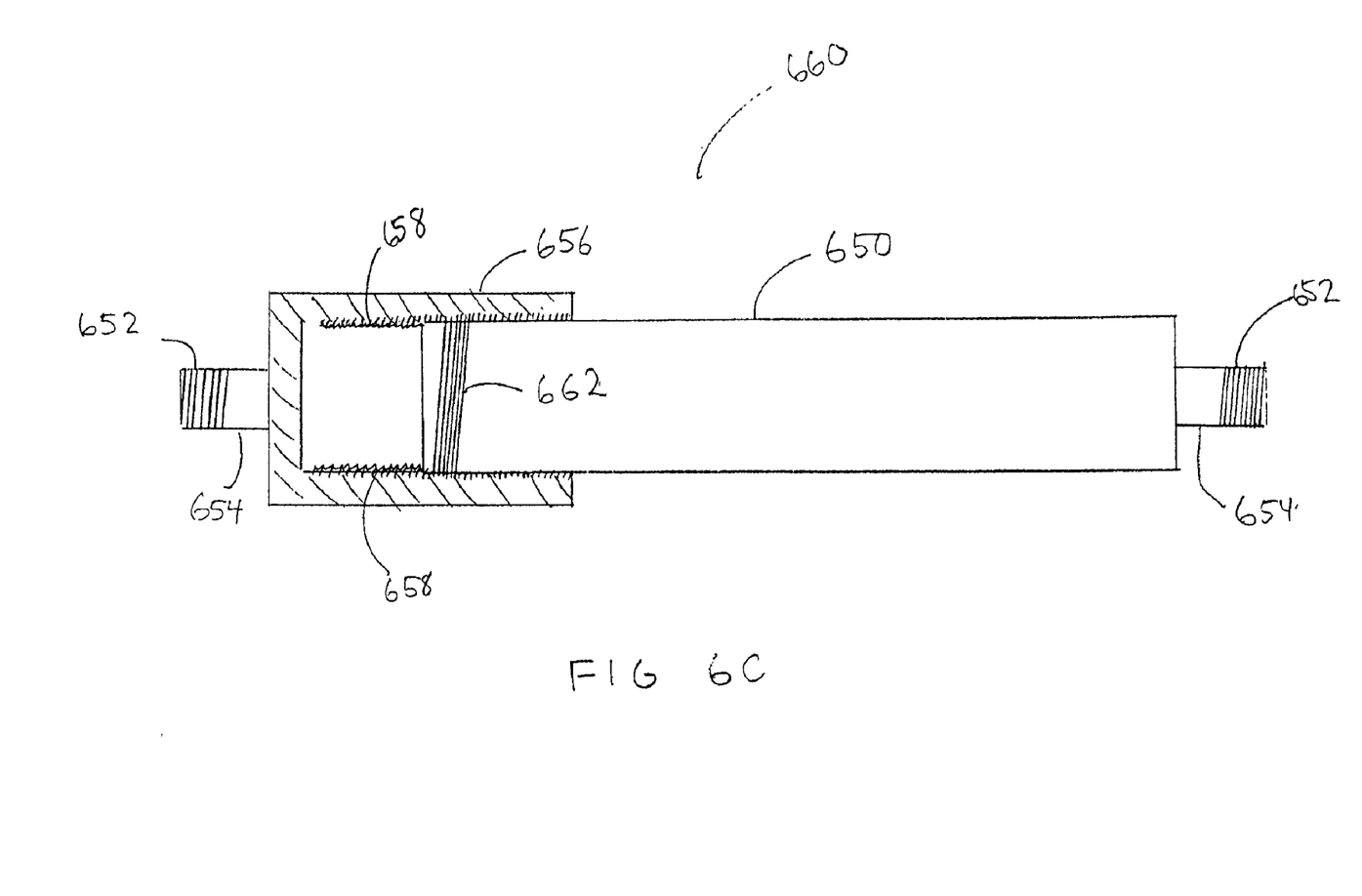
FIG. 6C shows an adjustable crossbar support beam having threaded inserts.

FIG. 6C shows yet another embodiment of an adjustable crossbar support beam 660. A retractable member 650 utilizes a threaded portion 662 to mate with a threaded portion 658 of a stationary member 656. The length of the support beam 660 is controlled by rotating the retractable member 650. In this embodiment, the support beam 660 is attached to the cooking apparatus 100 by inserting pins 654 through a hole in the base of the cooking apparatus. In the illustrated example, the pins 654 include threaded portions 652, that mate with a nut for securing the support arm to the cooking apparatus.

Figure 6D:
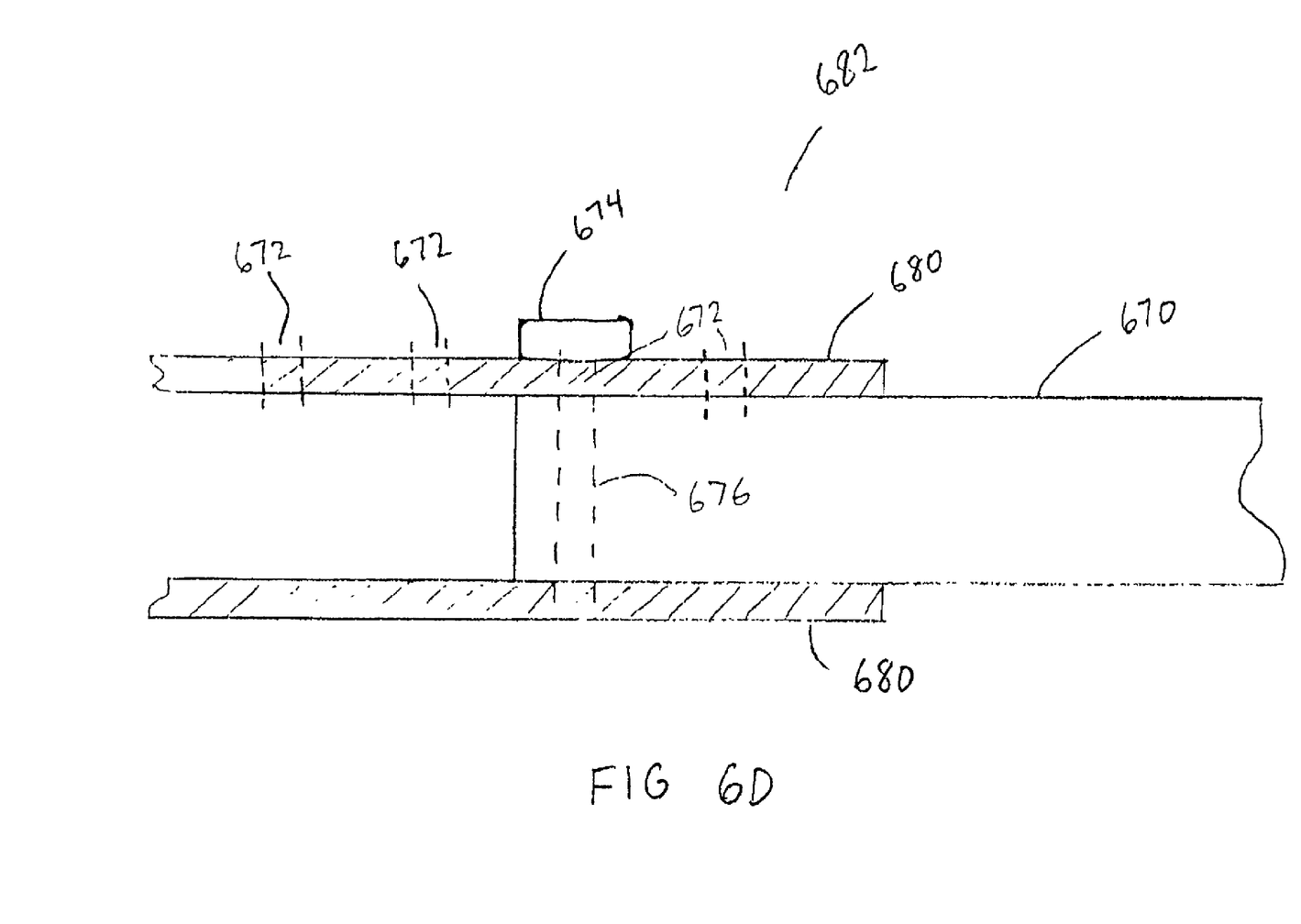
FIG. 6D shows another embodiment of an adjustable crossbar support beam.

FIG. 6D shows an embodiment of an adjustable crossbar support beam 682 where the length of the support beam 682 is determined by inserting a pin 674 through one of a plurality of holes. The support beam 682 has a larger member 680 with a plurality of holes 672, and a smaller member 670 with a hole 676 for inserting the pin. Alternatively, the smaller member 670 has a plurality of holes for selecting the length of the support beam 682.

Alternatively, the motor support beam may be attached to the cooking apparatus through a variety of ways such as hooks, cotter pins, or adhesives.

Figure 7:
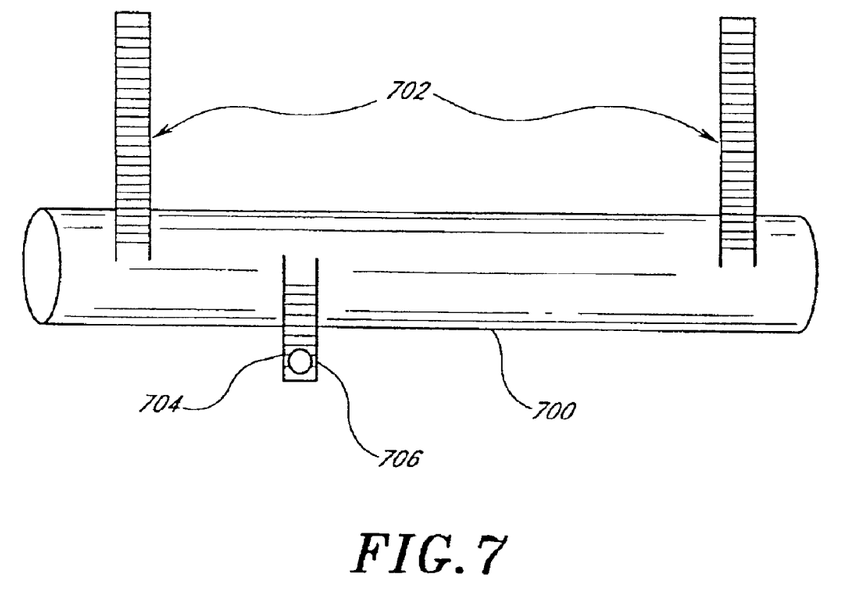
FIG. 7 shows a counterweight for attachment to the rear of a barbecue grill cover.

FIG. 7 shows a detailed view of the counterweight 700 with cover connectors 702 and coupling rod connector 704. In one embodiment, the counterweight 700 is connected to the lower rear portion of the cover 102. In another embodiment, the counterweight 700 is connected to the upper rear portion of the cover 102. In one embodiment, the cover connectors 702 extend horizontally from the counterweight 700 to the cover 102. In one embodiment, the cover connectors 702 extend at an angle from the counterweight 700. In one embodiment, the counterweight 700 is attached directly to the cover 102.

The mass of the counterweight 700 may vary. Some of the factors to consider when selecting the mass of the counterweight 700 include the mass of the cover 102, the distance of the counterweight 700 from the pivot point 104, and the power of the motor and motor receiver assembly 400. In one embodiment, the force of gravity acting on the counterweight 700 at the pivot point is equivalent to the force of gravity acting on the cover 102. Alternatively, the force of gravity acting on the counterweight 700 at the pivot point may be greater or less than the force of gravity acting on the cover 102. In another example, the coupling rod 200 is attached directly to the cover 102 without the use of a counterweight 700.

The foregoing description has been presented by way of example only, and should not be read in a limiting sense. Although this invention has been described in terms of certain preferred embodiments, other embodiments that are apparent to those of ordinary skill in the art, including embodiments that do not provide all of the benefits and features set forth herein, are also within the scope of this invention. Accordingly, the scope of the present invention is defined only by reference to the appended claims.

What is claimed is:

1. An apparatus for grilling, comprising:
    a grill having an upper surface and a lower surface, the lower surface being adapted for receiving heat from a healing source and the upper surface being adapted for transmitting heat for grilling;
    a cover having an interior surface and an exterior surface, wherein the cover comprises a rear portion, a front portion, and a lateral portion;
    a hollow cavity between the interior surface of the cover and the upper grilling surface, such that when the cover is substantially closed, objects on the grilling surface do not contact the interior surface of the cover;
    an opening formed between the front and lateral portions of the cover and the upper grilling surface, the opening being adjustable by rotation of the cover;
    a motor coupled to the rear portion of the cover, said motor operating to adjust the opening between the cover and the upper grilling surface; and
    a motor controller for adjusting the opening, wherein the motor and motor controller are configured to adjust the size of the opening during cooking to vary cooking conditions.

2. The apparatus of claim 1, wherein the motor controller comprises a remote control for transmitting control signals to said motor.

3. The apparatus of claim 2, wherein said remote control transmits start and stop signals to said motor.

4. The apparatus of claim 3, wherein said motor operates only during the transmission of control signals to said motor.

5. The apparatus of claim 3, wherein said remote control transmits signals to control flow of a combustible fuel.

6. The apparatus of claim 1, wherein said apparatus is removable from the cover; wherein removal of the motor does not prevent use of the grill.

7. The apparatus of claim 1, wherein said motor is battery powered.

8. The apparatus of claim 1, wherein said motor stops movement of the cover at a position between fully open and fully closed.

9. The apparatus of claim 1, wherein the cover is cupped over the upper grilling surface.

10. The apparatus of claim 1, wherein the cover is maintained in a partially open position during cooking.

11. The apparatus of claim 1, wherein the cover can be maintained at any position between fully open and fully closed.

12. A cooking apparatus, comprising:
- a grilling surface;
- a heating source for transmitting heat to the grilling surface;
- a cover that provides a hollow chamber having an adjustable opening over said grilling surface;
- a motor coupled to said cover, said motor operating to adjust the opening between said cover and said grilling surface; and
- a remote control that transmits a control signal to said motor, wherein the control signal causes the opening to vary in size during cooking, thereby varying the cooking conditions.

13. The cooking apparatus of claim 12, wherein said remote control transmits start and stop signals to said motor.

14. The cooking apparatus of claim 12, wherein said motor operates only during the transmission of control signals to said motor.

15. The cooking apparatus of claim 12, wherein said remote control transmits signals to control flow of a combustible fuel.

16. The cooking apparatus of claim 12, further comprising a counterweight attached at the rear of the cover.

17. The cooking apparatus of claim 12, wherein said motor is detachable.

18. The cooking apparatus of claim 12, wherein said motor is battery powered.

19. The cooking apparatus of claim 12, wherein said motor stops movement of the cover at a position between fully open and fully closed.

20. An apparatus for attaching a motor to a cover of a grilling surface, comprising:
- a motor support beam having an adjustable length, said motor support beam comprising a motor attachment surface for attachment to the motor and at least one base attachment surface for attachment to a support base of the grilling surface.

21. The apparatus of claim 20, further comprising a counterweight having a cover attachment surface for attachment of said counterweight to the cover of the grilling surface.

22. The apparatus of claim 21, further comprising a coupling rod for attaching the motor to said counterweight.

23. The apparatus of claim 20, further comprising a coupling rod for coupling the motor to the cover of the grilling surface.

24. The apparatus of claim 20, wherein said motor support beam comprises a first portion insertable into a second portion.

25. The apparatus of claim 24, wherein said first portion has a threaded exterior portion, and said second portion has a threaded interior portion, the length of said motor beam being determined by turning said first portion with respect to said second position.

26. The apparatus of claim 24, wherein said motor support beam further comprises a spring member that presses said first portion away from said second portion.

27. The apparatus of claim 24, wherein at least one of said first portion and said second portion has a plurality of holes, the length of said motor beam being determined by inserting a pin through one of said plurality of holes.

28. The apparatus of claim 24, wherein the motor suspends from said motor support beam.

29. An apparatus for grilling, comprising:
- a grill having an upper surface and a lower surface, the lower surface being adapted for receiving heat from a heating source and the upper surface being adapted for transmitting heat for grilling wherein said lower grilling surface is heated by a charcoal briquette fueled heat source;
- a cover having an interior surface and an exterior surface, wherein the cover comprises a rear portion, a front portion, and a lateral portion;
- a hollow cavity between the interior surface of the cover and the upper grilling surface, such that when the cover is substantially closed, objects on the grilling surface do not contact the interior surface of the cover;
- an opening formed between the front and lateral portions of the cover and the upper grilling surface, the opening being adjustable by rotation of the cover;
- a motor coupled to the rear portion of the cover, said motor operating to adjust the opening between the cover and the upper grilling surface; and
- a motor controller for adjusting the opening.

* * * * *